US008491149B2

(12) United States Patent
Weiser

(10) Patent No.: US 8,491,149 B2
(45) Date of Patent: Jul. 23, 2013

(54) BATTERY POWERED DECORATIVE LIGHT WITH TIMER

(75) Inventor: Margaret Weiser, Chatsworth, CA (US)

(73) Assignee: Exhart Environmental Systems, Inc., Chatsworth, CA (US)

(*) Notice: Subject to any disclaimer, the term of this patent is extended or adjusted under 35 U.S.C. 154(b) by 265 days.

(21) Appl. No.: 13/184,095

(22) Filed: Jul. 15, 2011

(65) Prior Publication Data

US 2013/0015782 A1  Jan. 17, 2013

(51) Int. Cl.
*F21V 35/00* (2006.01)
(52) U.S. Cl.
USPC ........... 362/161; 362/405; 362/240; 362/227; 362/249.16; 315/297; 315/294; 315/312; 315/360
(58) Field of Classification Search
USPC .................... 362/122, 147, 157, 161, 249.16, 362/240, 227, 392, 396, 404–406, 431, 441, 362/443, 451; 315/291, 294, 297, 312, 360
See application file for complete search history.

(56) References Cited

U.S. PATENT DOCUMENTS

| 3,831,022 | A  | * | 8/1974 | Porter et al. | 362/406 |
|---|---|---|---|---|---|
| 6,487,763 | B1 | * | 12/2002 | Reichert | 29/281.5 |
| 6,929,380 | B2 | * | 8/2005 | Logan et al. | 362/161 |
| 7,990,252 | B2 | * | 8/2011 | Barton | 340/333 |
| 2004/0095762 | A1 | * | 5/2004 | Sullivan | 362/237 |
| 2005/0196716 | A1 | * | 9/2005 | Haab et al. | 431/126 |
| 2006/0125420 | A1 | * | 6/2006 | Boone et al. | 315/291 |
| 2007/0159813 | A1 | * | 7/2007 | Husbands | 362/122 |
| 2009/0073678 | A1 | * | 3/2009 | Sherer | 362/147 |
| 2010/0001662 | A1 | * | 1/2010 | Nelkin et al. | 315/294 |

* cited by examiner

*Primary Examiner* — Haiss Philogene
(74) *Attorney, Agent, or Firm* — Cislo & Thomas, LLP

(57) ABSTRACT

A decorative light in the form of a candelabrum, chandelier, or sphere, the candelabrum and chandelier having a plurality of artificial flower blossoms, each with an LED. A control circuit is electronically connected to each LED and has electronic circuitry to cause each LED to illuminate at a preselected time each day, remain illuminated for a predetermined interval, and then extinguish.

50 Claims, 20 Drawing Sheets

US 8,491,149 B2

BATTERY POWERED DECORATIVE LIGHT WITH TIMER

TECHNICAL FIELD

This invention relates to decorative lighting.

BACKGROUND ART

While there are a number of decorative lights in the prior art, none include the combination of features disclosed here.

US 2009/0073678 discloses battery operated sconces, battery operated chandeliers, battery operated candles and candles.

U.S. Pat. No. 3,831,022 discloses a prewired chandelier having a supporting stem with radially extended arms hingedly connected to the stem to permit them to be folded into a more compact form without disturbing the prewiring.

US 2010/0001662 discloses an electric lighting lamp or bulb having an LED light source mounted to a candle base, where driver circuitry for the LED light source is housed within the candle base. A transparent envelope encloses the LED light source, and the lamp presents the appearance of a traditional candle and/or of an incandescent candelabra or chandelier-type lamp or bulb.

US 20040095762 discloses an ornamental article is disclosed that is spherical in shape and has a plurality of clear cups covering the surface of the sphere with their open end facing outward. The ornamental article has a plurality of lighting strings each with a plurality of lights, with a light from each string extending through the bottom of each of the cups. A control circuit energizes the lights of each of the plurality of lighting strings to produce different lighting patterns for the lights. The light is refracted through the clear material of the cups to enhance the ornamental quality of the ornamental assembly.

Consequently, none of the existing devices discloses a readily portable, easy to install, versatile, battery powered, decorative light of the type discussed below.

DISCLOSURE OF INVENTION

One aspect of the decorative light can be described generally as having a candelabrum fixture, a plurality of artificial flower blossoms supported on the candelabrum fixture, a light emitting diode (LED) in each of the artificial flower blossoms, a control circuit, and a battery.

The candelabrum fixture rests on a base, which defines a horizontal plane. The candelabrum fixture has a plurality of arms that branch laterally from a central post. The plurality of arms defines a vertical plane running through the central post, and the horizontal plane of the base is perpendicular to the vertical plane of the arms. The base, supports the candelabrum fixture and permits the candelabrum fixture to be free-standing.

The plurality of artificial flower blossoms is supported on the candelabrum fixture. Each artificial flower blossom is centered about the vertical plane. Furthermore, each artificial flower blossom has an artificial corolla and an artificial calyx. Each artificial flower blossom also forms a first cuplike cavity closed sides and an open top. The calyx has a plurality of artificial sepals, where each sepal has a fixed end and a cantilevered end opposite the fixed end.

The control circuit is housed within the base, and it is electronically connected to each LED. The control circuit has electronic circuitry to cause each LED to illuminate at a preselected time each day, remain illuminated for a predetermined interval, and then extinguish. The battery is housed within the base, and it is electrically connected to each LED and the control circuit to provide electrical power to each LED and the control circuit.

Another aspect of the decorative light can be described generally as having a chandelier fixture, an artificial flower blossom, a light emitting diode (LED) in the artificial flower blossom, a housing, a control circuit, and a battery.

The chandelier fixture is suspended from a hook, and it has a plurality of arms that branch radially from a vertical axis. Each arm defines a radial plane. The hook supports the chandelier fixture and is located on the vertical axis.

An artificial flower blossom is supported on each arm, and the artificial flower blossom has an artificial corolla and an artificial calyx. The corolla forms a first cuplike cavity that has closed sides and an open top. The calyx has a plurality of artificial sepals, and each sepal has a fixed end and a cantilevered end opposite the fixed end.

The housing is located between the hook and the chandelier fixture is a decorative collar.

The control circuit is within the housing, and it is electronically connected to the LED. The control circuit has electronic circuitry to cause the LED to illuminate at a preselected time each day, remain illuminated for a predetermined interval, and then extinguish. The battery is within the housing, and it is electrically connected to the LED and the control circuit to provide electrical power to the LED and the control circuit.

Yet another aspect of the decorative light can be described generally as having a suspended sphere, a light-diffractive ornament, an array of light emitting diodes (LED), a housing separate from the sphere, a control circuit, and a battery.

The sphere has a sphere diameter and an interior, and the interior is hollow. The sphere has a plurality of metallic rings, and each ring has a ring diameter. Each ring is connected to at least three adjacent rings. The plurality of metallic rings forms a shell of the sphere, where the shell of the sphere also has interstices between the rings.

The light-diffractive ornament is centered within each of the plurality of metallic rings, and the ornament has a front side and a back side. The array of LED is arranged in the interior of the sphere.

The control circuit is within the housing, and it is electronically connected to the array of LED. The control circuit has electronic circuitry to cause the array of LED to illuminate at a preselected time each day, remain illuminated for a predetermined interval, and then extinguish. The battery is within the housing, and it is electrically connected to the array of LED and the control circuit to provide electrical power to the array of LED and the control circuit.

BEST MODE FOR CARRYING OUT THE INVENTION

Figure 1:
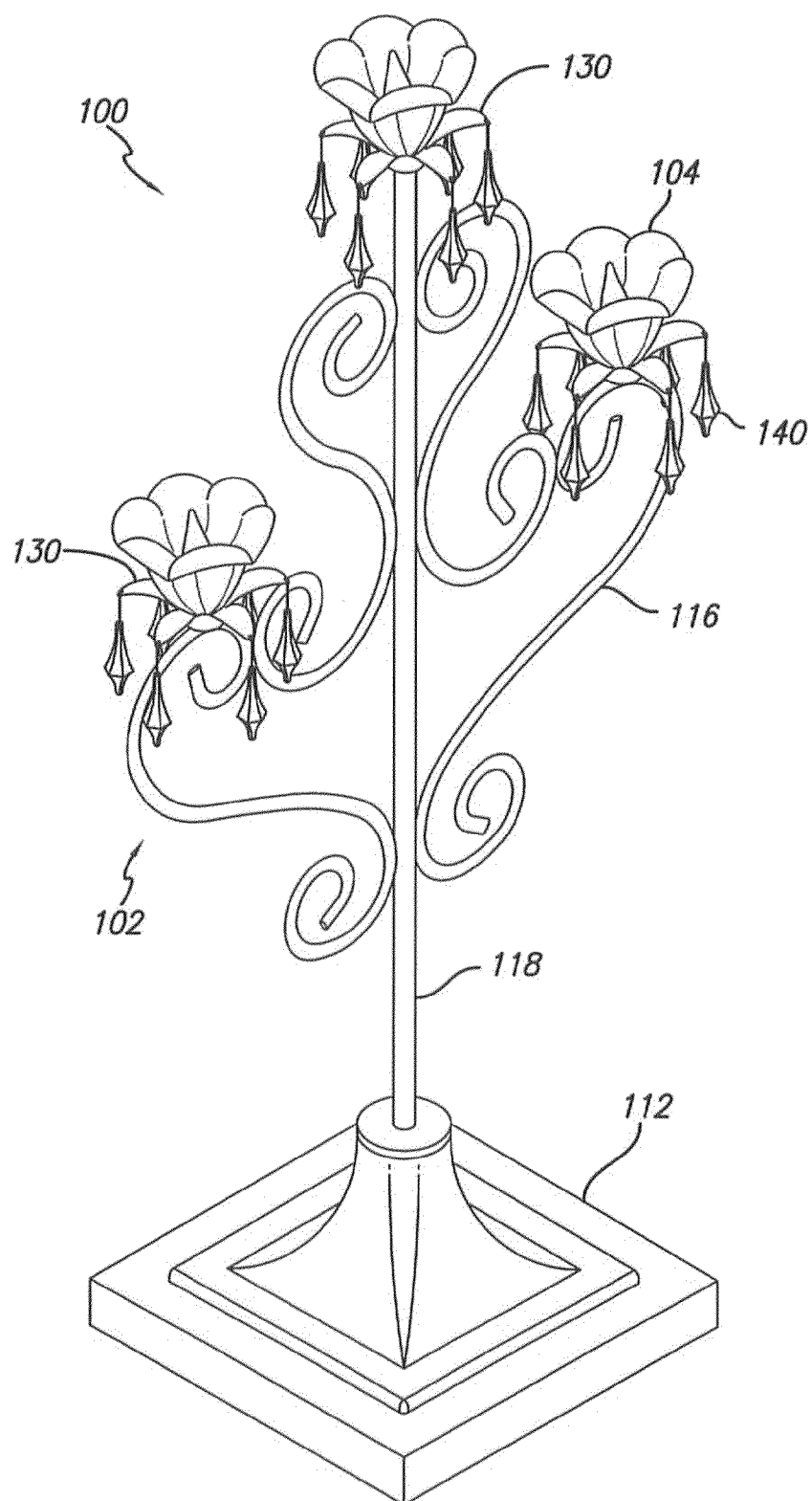
FIG. 1 is a perspective view of an embodiment of a Battery Powered Decorative Light with Timer in the form of a candelabrum.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

In an embodiment of the invention shown in FIGS. 1-6, the decorative light 100 includes a candelabrum fixture 102, a plurality of artificial flower blossoms 104 supported on the candelabrum fixture 102, a light emitting diode (LED) 106 in each of the artificial flower blossoms 104, a contrail circuit 108, and a battery 110.

Figure 2:
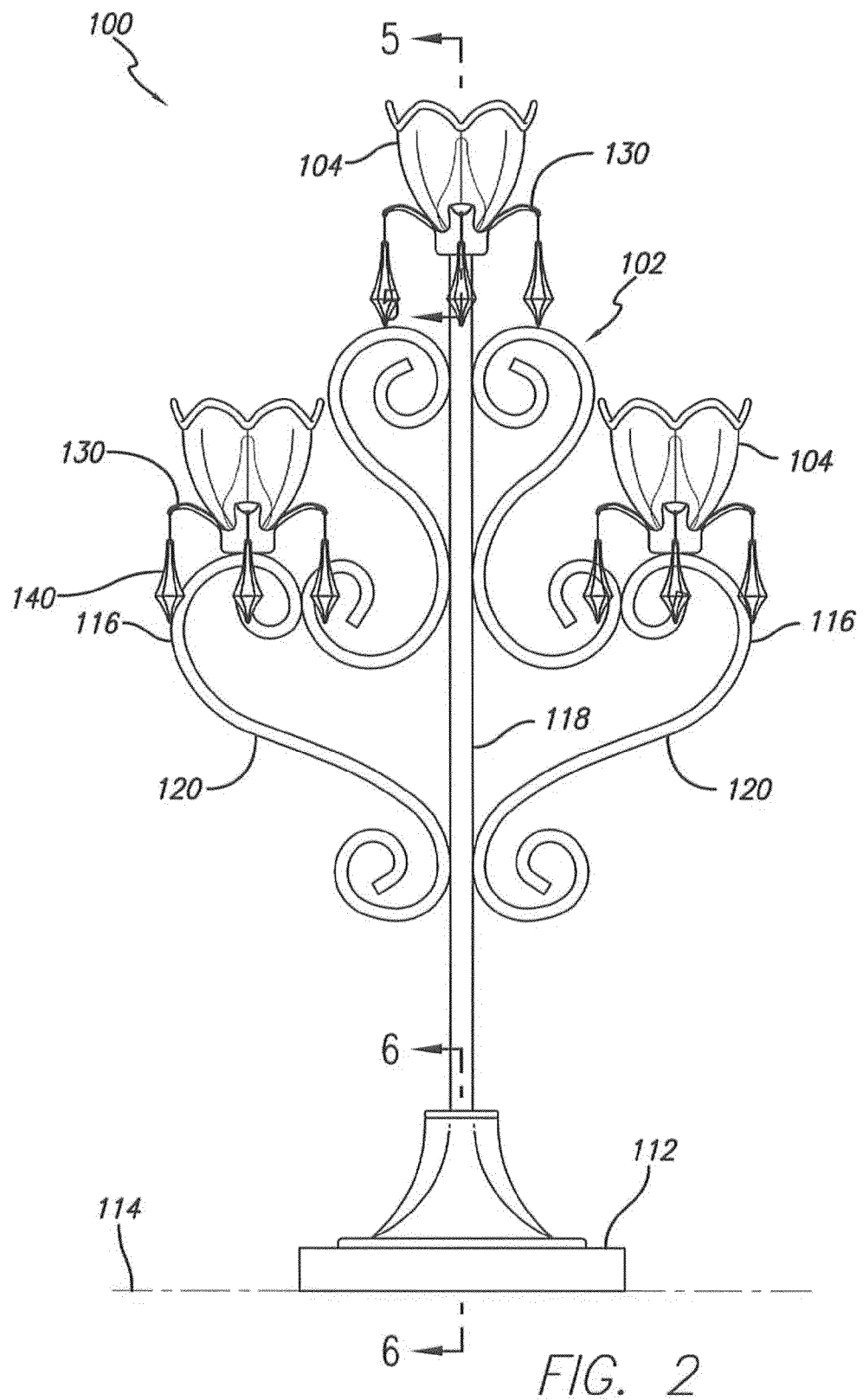
FIG. 2 is a front view of the embodiment of the Battery Powered Decorative Light with Timer shown in FIG. 1.
Figure 3:
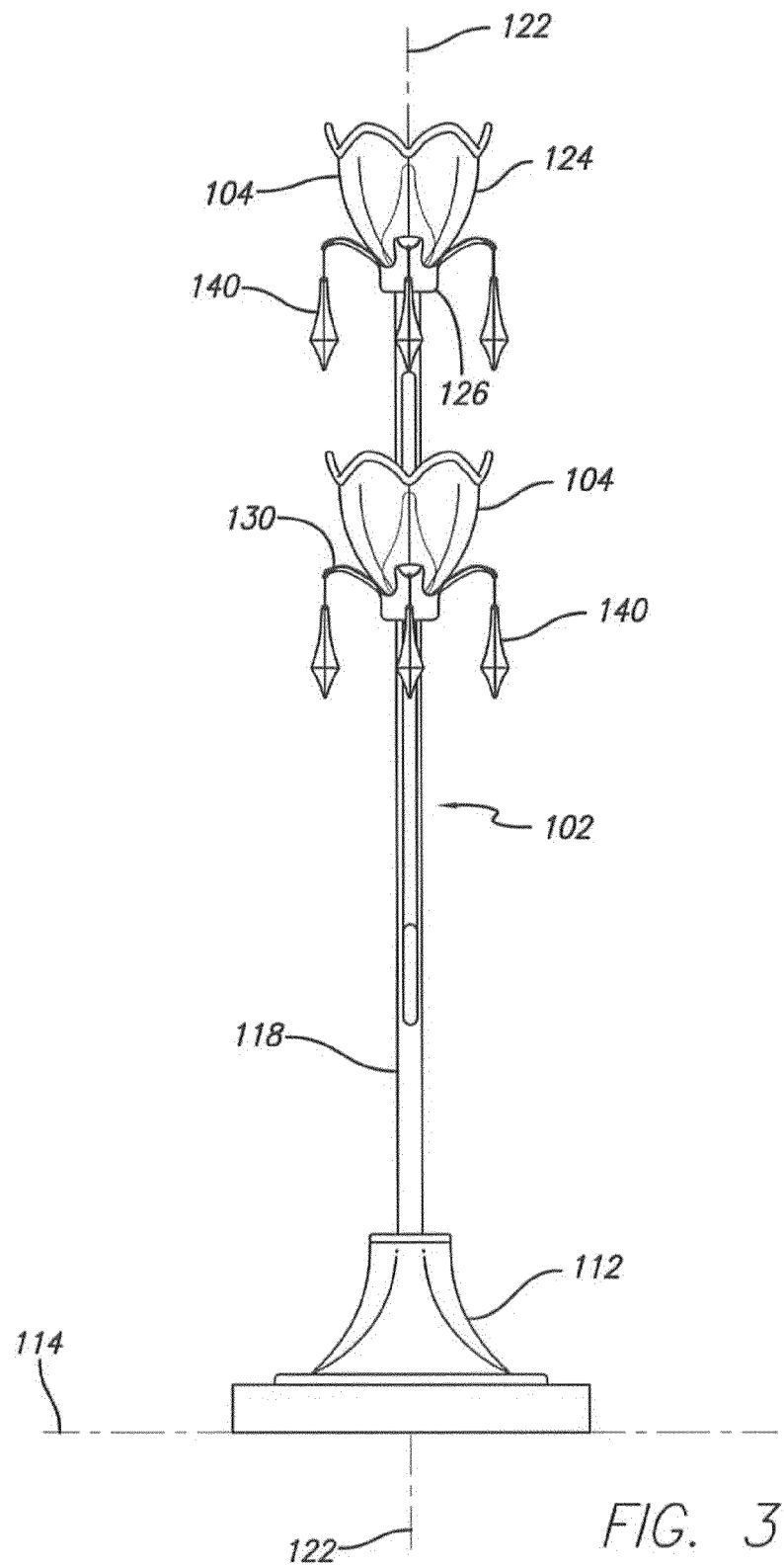
FIG. 3 is a right side view of the embodiment of the Battery Powered Decorative Light with Timer shown in FIG. 1.
Figure 4:
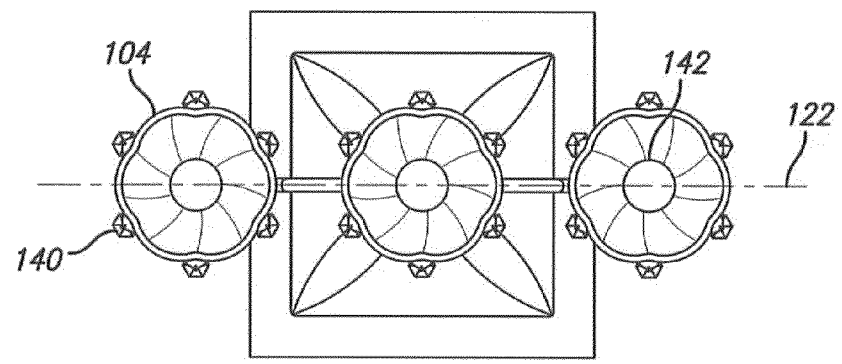
FIG. 4 is a top view of the embodiment of the Battery Powered Decorative Light with Timer shown in FIG. 1.
Figure 5:
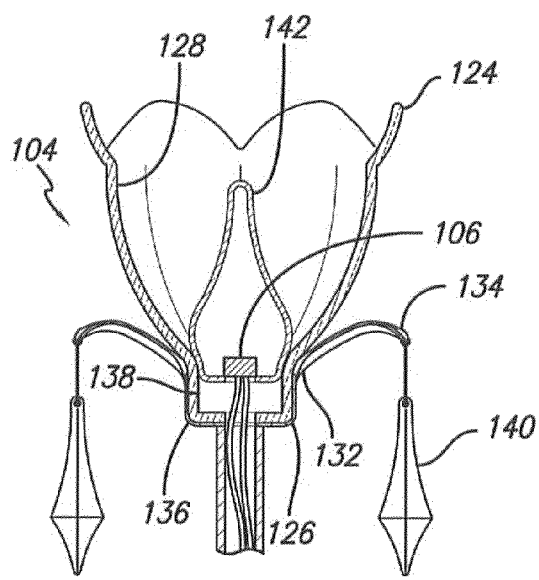
FIG. 5 is a sectional view of the region of the LED in isolation taken along the line 5-5 shown in FIG. 2.
Figure 6:
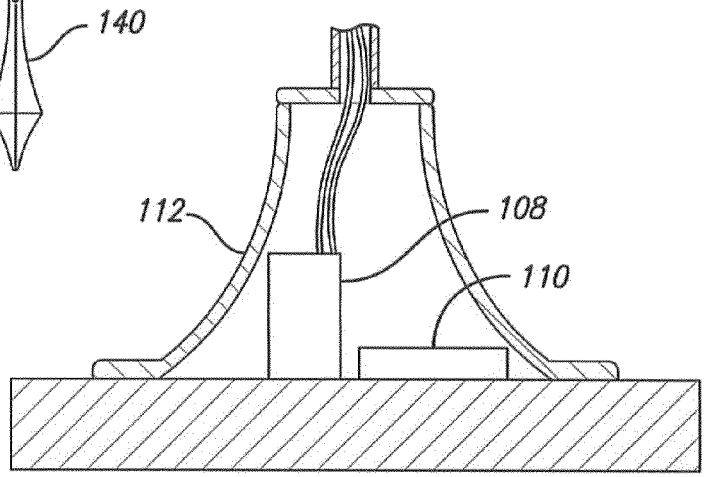
FIG. 6 is a sectional view of the base in isolation taken along the line 6-6 shown in FIG. 2.
Figure 7:
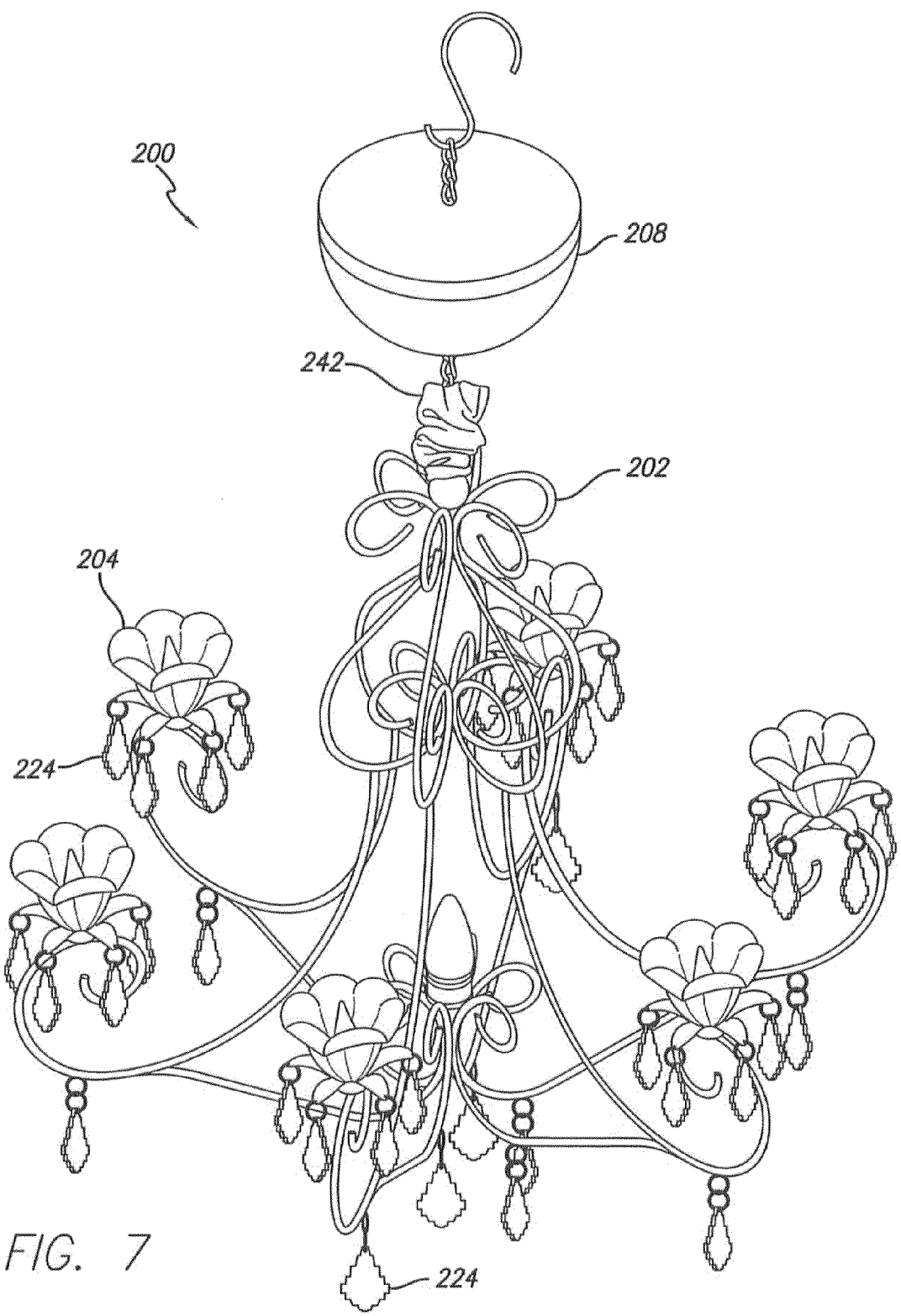
FIG. 7 is a perspective view of an embodiment of a Battery Powered Decorative Light with Timer in the form of a chandelier.
Figure 8:
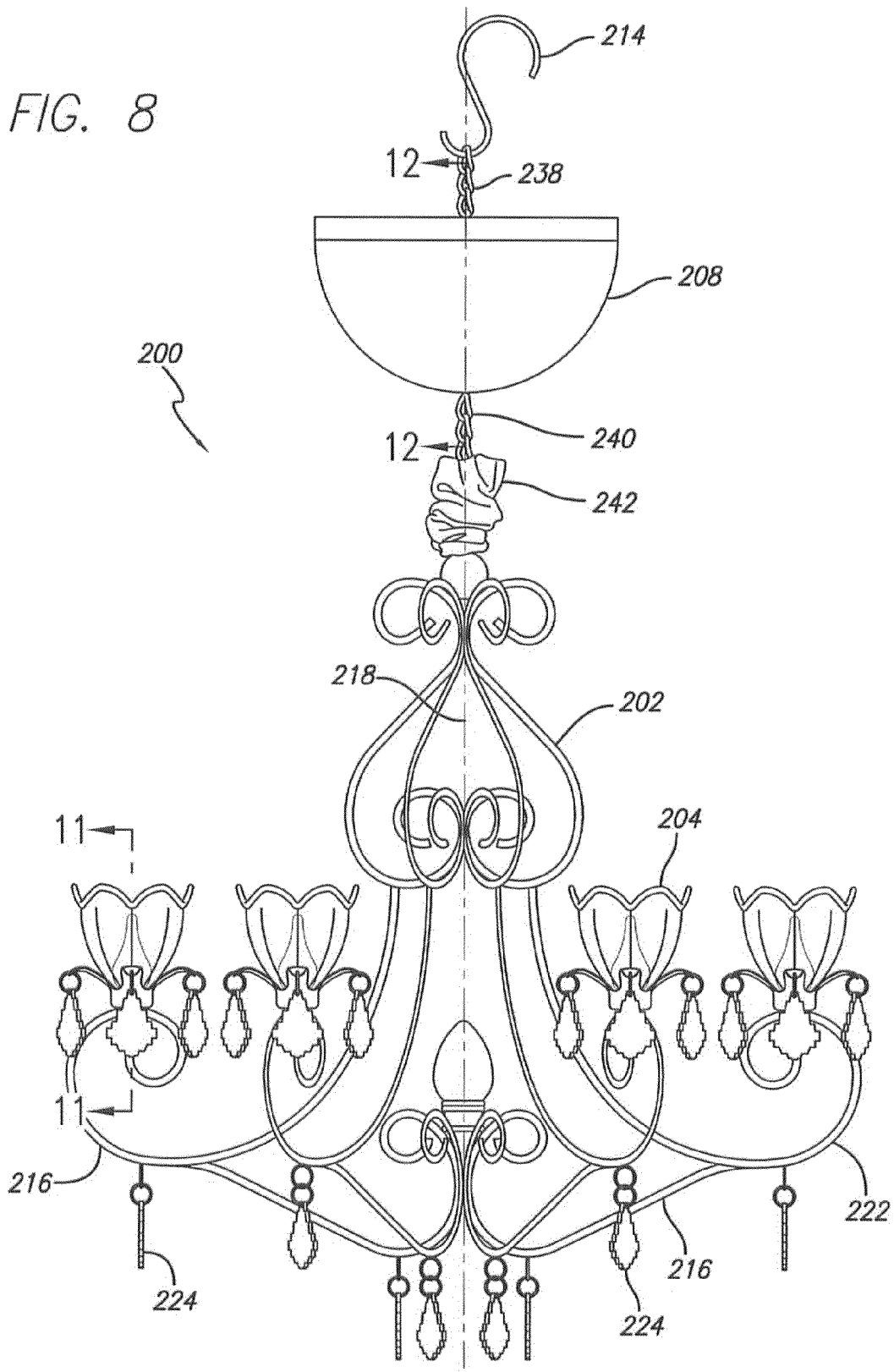
FIG. 8 is a front view of the embodiment of the Battery Powered Decorative Light with Timer shown in FIG. 7.
Figure 9:
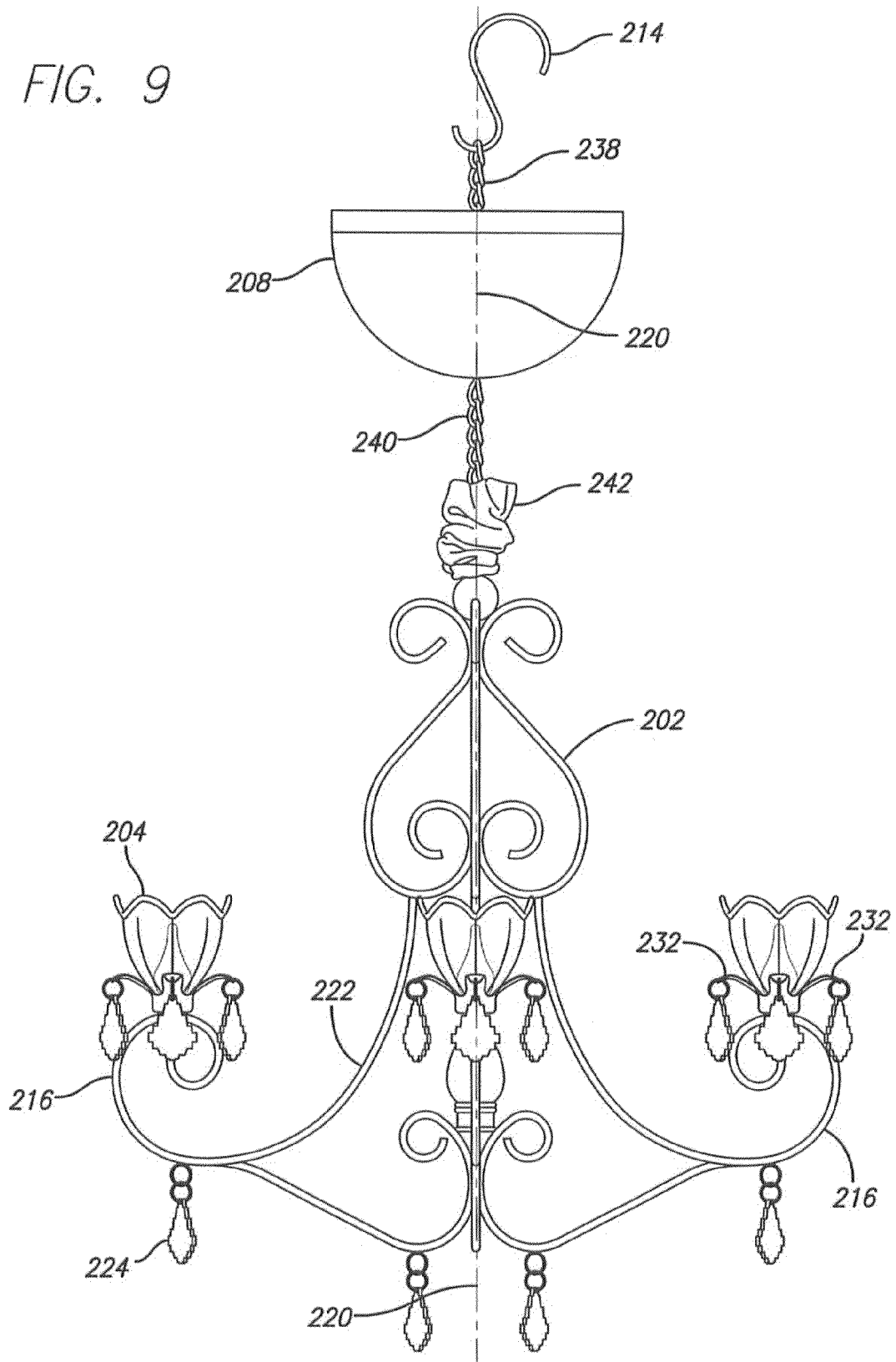
FIG. 9 is a right side view of the embodiment of the Battery Powered Decorative Light with Timer shown in FIG. 7.
Figure 10:
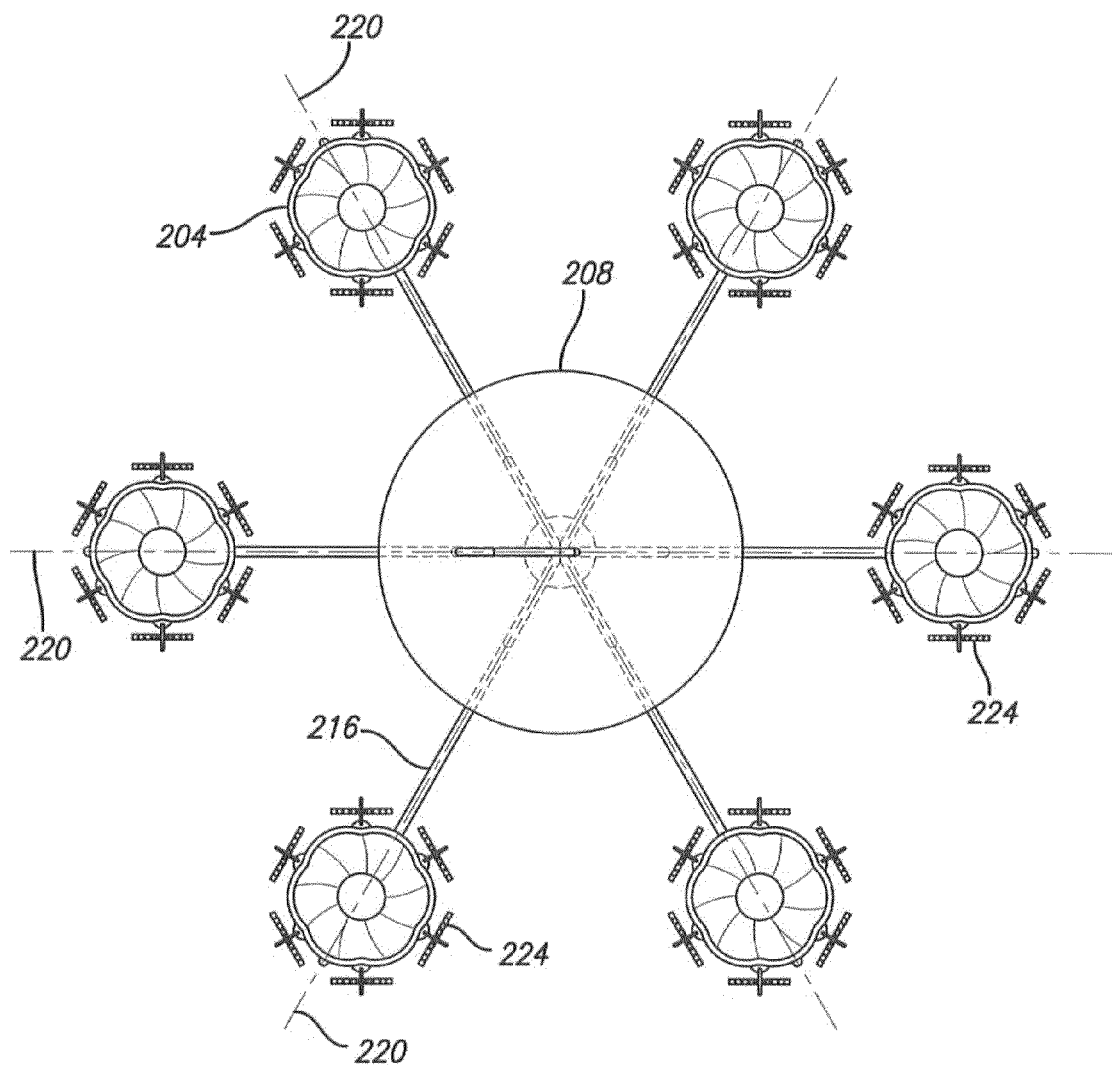
FIG. 10 is a top view of the embodiment of the Battery Powered Decorative Light with Timer shown in FIG. 7.
Figure 11:
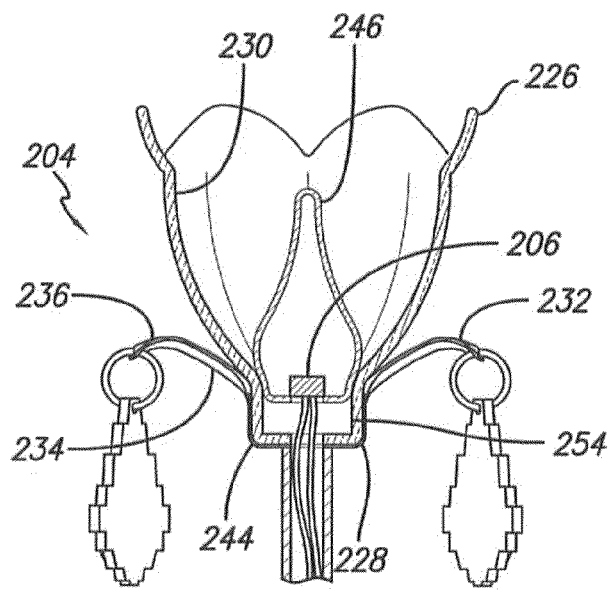
FIG. 11 is a sectional view of the region of the LED in isolation taken along the line 11-11 shown in FIG. 8.
Figure 12:
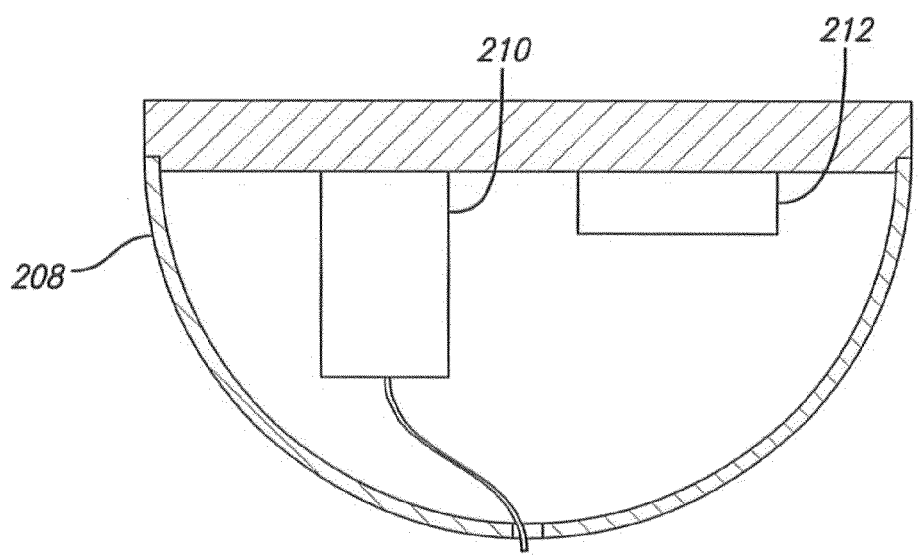
FIG. 12 is a sectional view of the housing in isolation taken along the line 12-12 shown in FIG. 8.
Figure 13:
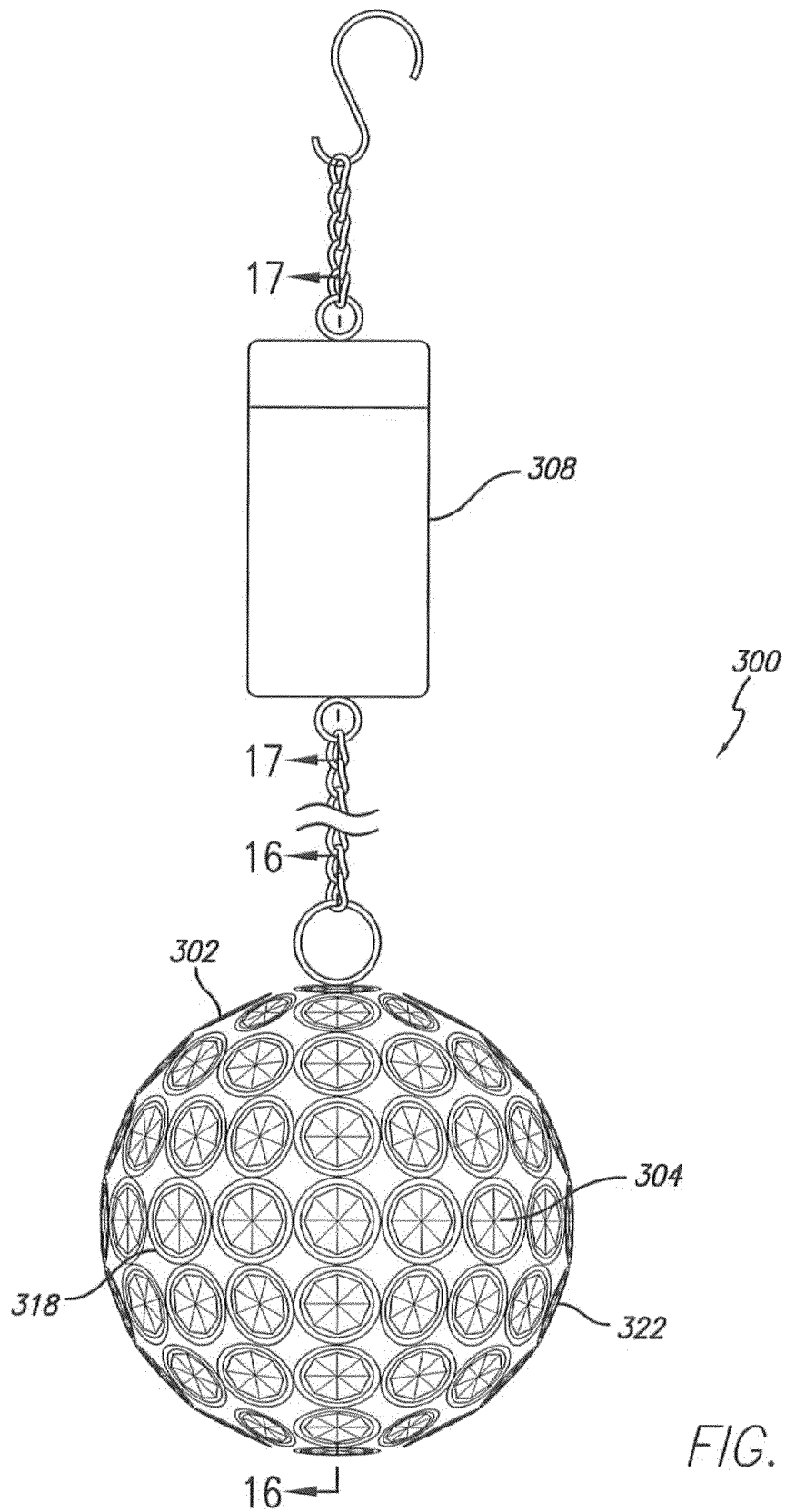
FIG. 13 is a front view of an embodiment of a Battery Powered Decorative Light with Timer in the form of a sphere.
Figure 14:
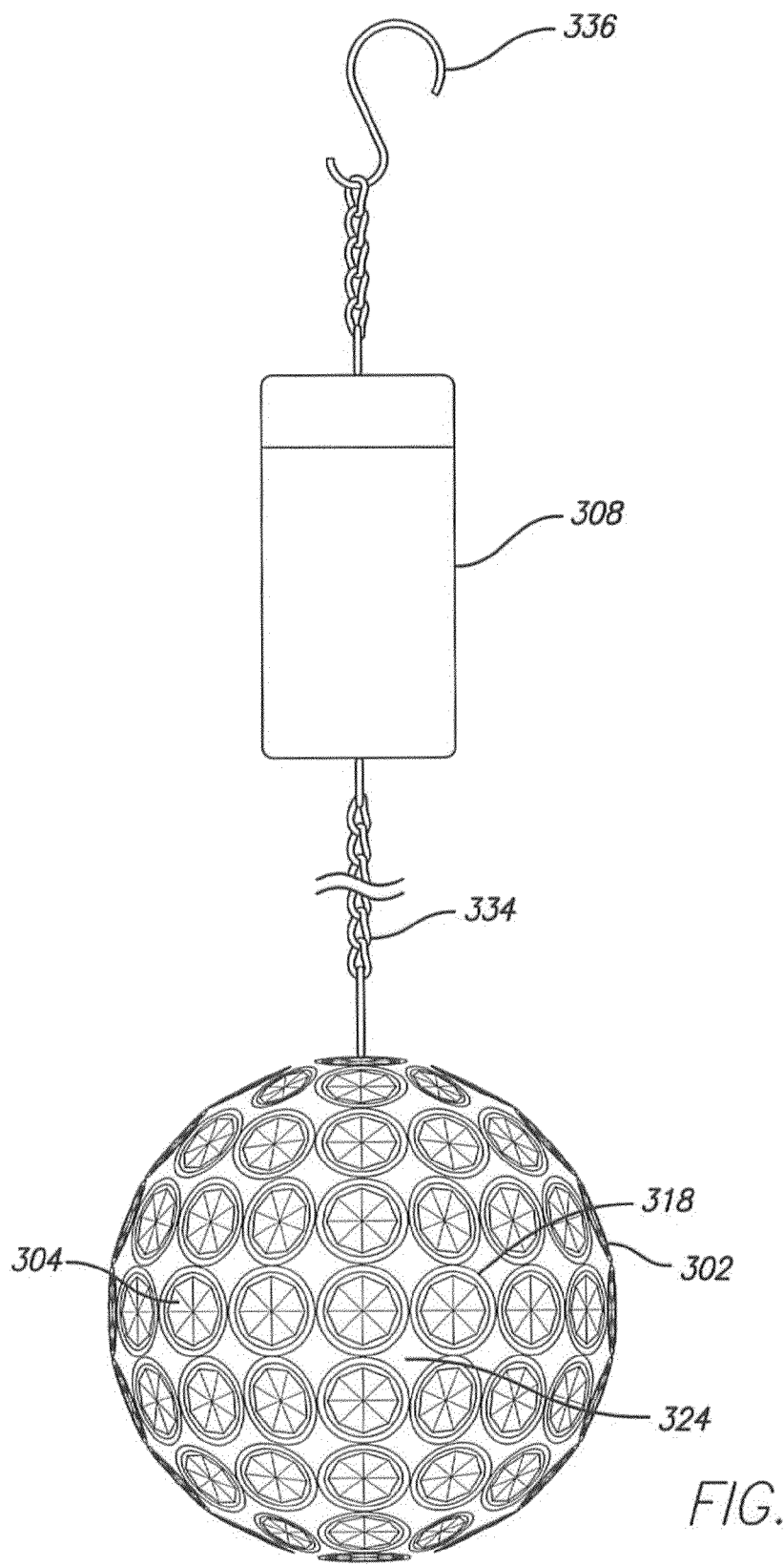
FIG. 14 is a right side view of the embodiment of the Battery Powered Decorative Light with Timer shown in FIG. 13.
Figure 15:
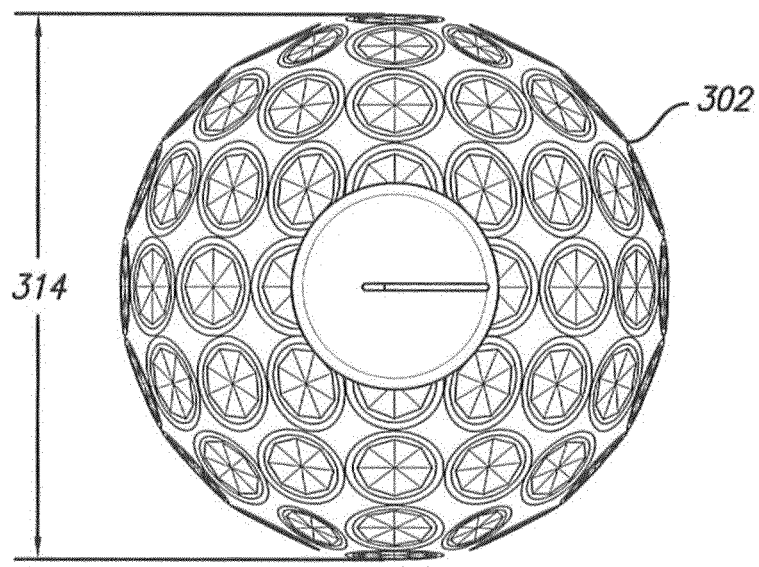
FIG. 15 is a top view of the embodiment of the Battery Powered Decorative Light with Timer shown in FIG. 13.
Figure 16:
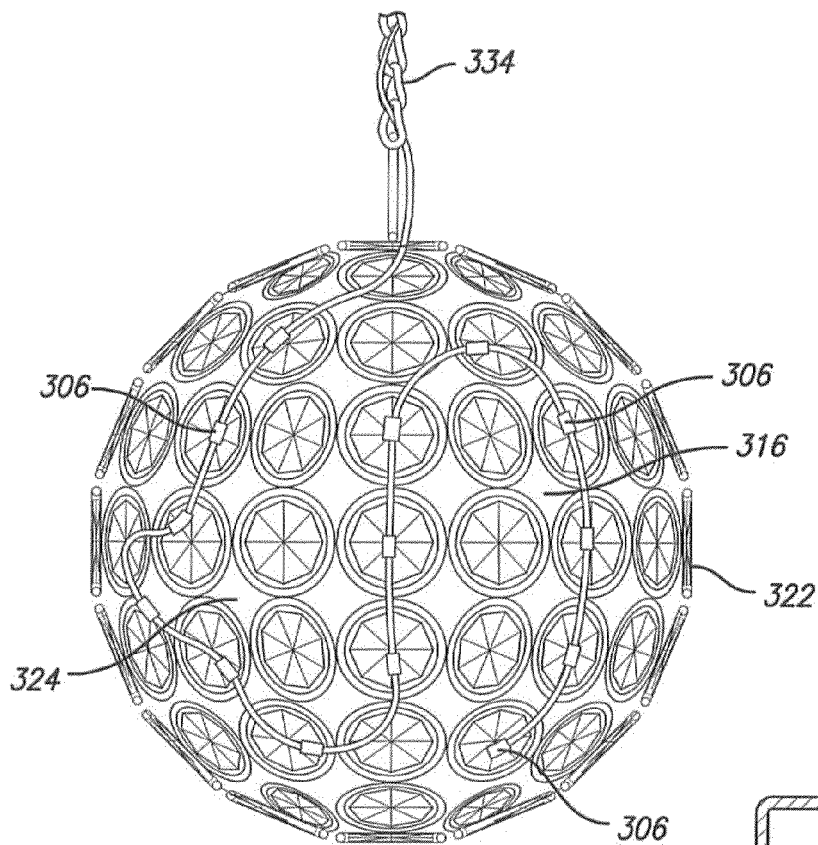
FIG. 16 is a sectional view of the sphere taken along the line 16-16 shown in FIG. 13.
Figure 17:
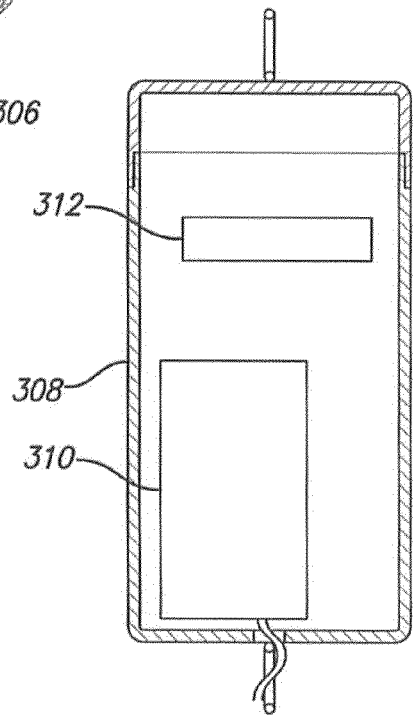
FIG. 17 is a sectional view of the housing in isolation taken along the line 17-17 shown in FIG. 13.
Figure 18:
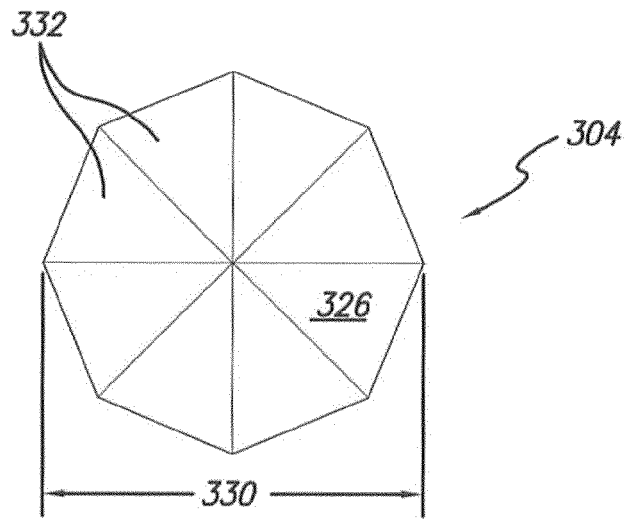
FIG. 18 is a view of the front side of the light-diffractive ornament shown in FIG. 13 in isolation.
Figure 19:
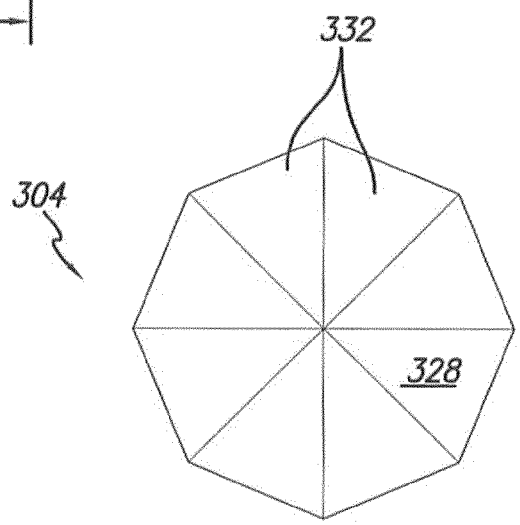
FIG. 19 is a view of the rear side of the light-diffractive ornament shown in FIG. 18.
Figure 20:
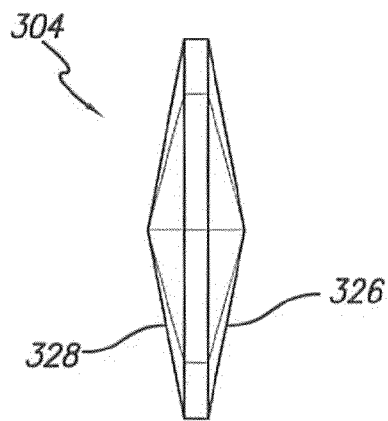
FIG. 20 is a side view of the light-diffractive ornament shown in FIG. 18.
Figure 21:
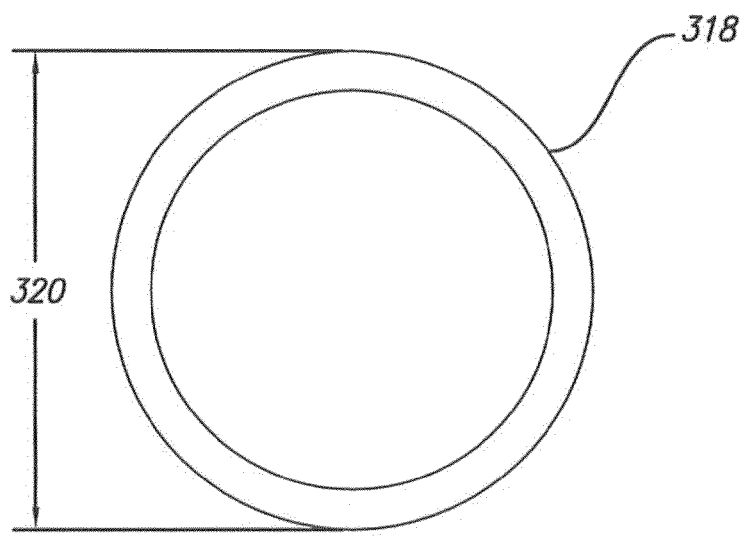
FIG. 21 is a front view of a metallic ring shown in isolation.
Figure 22:
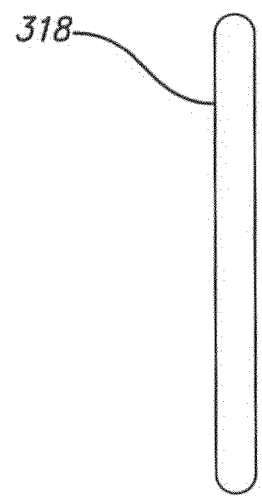
FIG. 22 is a side view of a metallic ring shown in isolation.

The candelabrum fixture 102 rests on a base 112, which defines a horizontal plane 114 (shown from two different ends in FIGS. 2 and 3). In a version of the invention, the base 112 is rectangular. The candelabrum fixture 102 has a plurality of arms 116 that branch laterally from a central post 118. In a version of the invention, each arm 116 includes an S-curve 120. The plurality of arms 116 defines a vertical plane 122 (shown from two different ends in FIGS. 3 and 4) running through the central post 118, and the horizontal plane 114 of the base 112 is perpendicular to the vertical plane 122 of the arms 116. The base 112 supports the candelabrum fixture 102 and permits the candelabrum fixture 102 to be freestanding.

The plurality of artificial flower blossoms 104 is supported on the candelabrum fixture 102, preferably by being directly attached to the candelabrum fixture 102. Each artificial flower blossom 104 is centered about the vertical plane 122. Furthermore, each artificial flower blossom 104 has an artificial corolla 124 and an artificial calyx 126. Each artificial flower blossom 104 also forms a first cuplike cavity 128 having closed sides and an open top. The calyx 126 has a plurality of artificial sepals 130, where each sepal 130 has a fixed end 132 and a cantilevered end 134 opposite the fixed end 132. Preferably, the corolla 124 is made of see-through glass permitting the LED 106 to be visible through the corolla 124. Throughout this description, the term "glass" means common glass as well as other substances, such as acrylic resins, that have the glass-like properties of being hard and transparent or translucent. Preferably, the calyx 126 is metallic to blend visually with the candelabrum fixture 102 and to provide structural integrity. In a version of the invention, the fixed end 132 of each sepal 130 is attached to a second cuplike cavity 136, which encases and supports the bottom 138 of the artificial corolla 124. In a version of the invention, each sepal 130 has a drop ornament 140 dangling from the cantilevered end 134. The drop ornament 140 is preferably made from glass.

Figure 25:
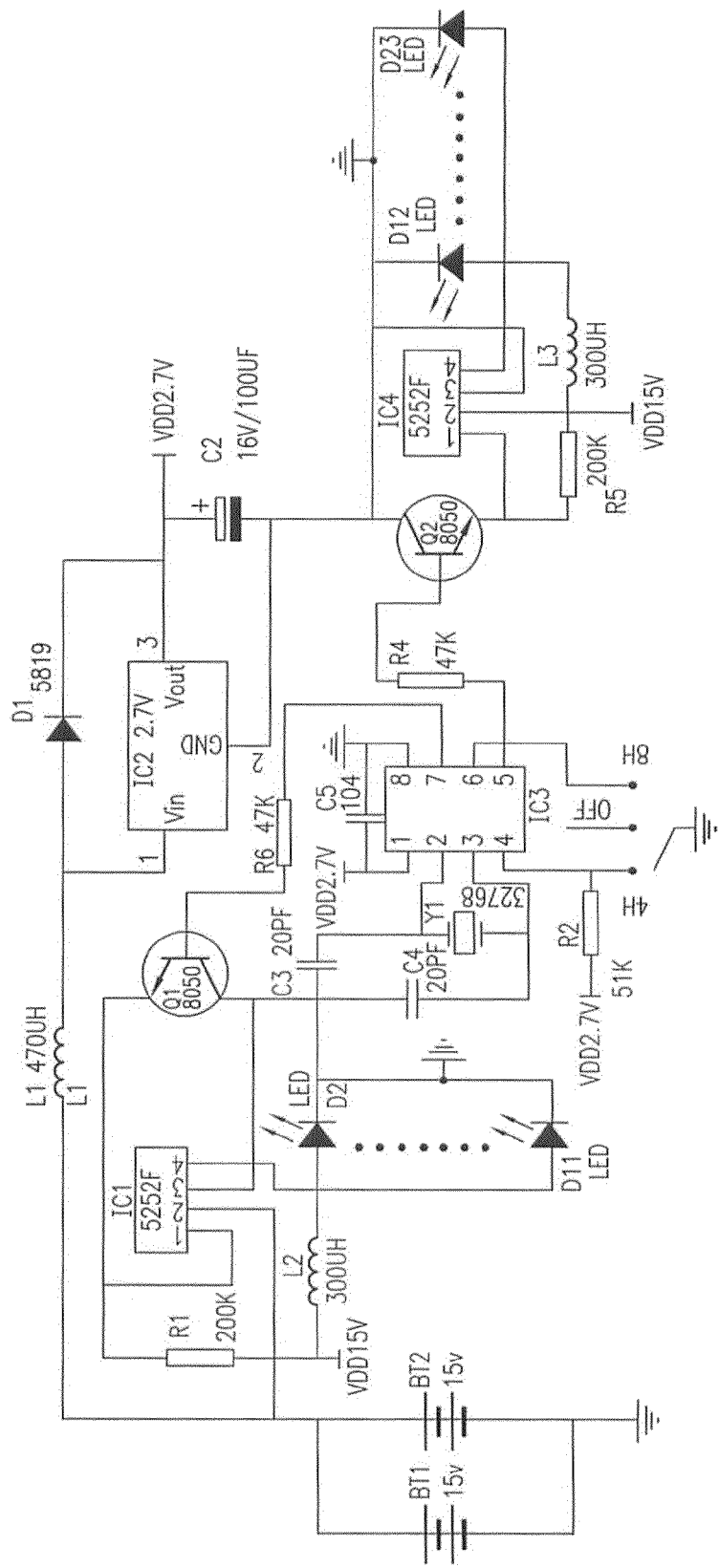
FIG. 25 is a schematic of one version of the control circuit for an embodiment of a Battery Powered Decorative Light with Timer.

The control circuit 108 is housed within the base 112, and it is electronically connected to each LED 106. The control circuit 108 has electronic circuitry to cause each LED 106 to illuminate at a preselected time each day, remain illuminated for a predetermined interval, and then extinguish. In a version of the invention, control circuit 108 is housed within the central post 118. An example of one version of the control circuit 108 is shown in FIG. 25.

The battery 110 is housed within the base 112, and it is electrically connected to each LED 106 and the control circuit 108 to provide electrical power to each LED 106 and the control circuit 108. In a version of the invention, the LED 106 is encapsulated in an artificial flame 142 formed from plastic. In some embodiments, the LED 106 is secured at the bottom 138 of the artificial corolla 124. In a version of the invention, battery 110 is housed within the central post 118.

In an embodiment of the invention shown in FIGS. 7-12, the decorative light 200 includes a chandelier fixture 202, an artificial flower blossom 204, a light emitting diode (LED) 206 in the artificial flower blossom 204, a housing 208, a control circuit 210, and a battery 212.

The chandelier fixture 202 is suspended from a hook 214, and it has a plurality of arms 216 that branch radially from a vertical axis 218. Preferably, the plurality of arms 216 also branch symmetrically from the vertical axis 218. Each arm 216 defines a radial plane 220, which is shown from two different edges in FIG. 9 (for one of the radial planes 220) and 10). Preferably, each arm 216 includes a curvilinear tube 222. The hook 214 supports the chandelier fixture 202 and is located on the vertical axis 218. In a version of the invention, each arm 216 has a dangling drop ornament 224. The drop ornament 224 is preferably made from glass.

An artificial flower blossom 204 is supported on each arm 216, and the artificial flower blossom 204 has an artificial corolla 226 and an artificial calyx 228. In a version of the invention, the artificial flower blossom 204 is centered about the radial plane 220 for the arm 216. Preferably, the corolla 226 is made of see-through glass, and the calyx 228 is metallic. The corolla 226 forms a first cuplike cavity 230 that has closed sides and an open top. The calyx 228 has a plurality of artificial sepals 232, and each sepal 232 has a fixed end 234 and a cantilevered end 236 opposite the fixed end 234. In a version of the invention, the fixed end 234 of each sepal 232 is attached to a second cuplike cavity 244, which encases the bottom 254 of the artificial corolla 226. In a version of the invention, each sepal 232 has a drop ornament 224 dangling from the cantilevered end 236.

The housing 208, which is a decorative collar, is located between the hook 214 and the chandelier fixture 202. Preferably, the housing 208 is separate from the hook 214 and the chandelier fixture 202. In a version of the invention, the housing 208 is connected to the hook 214 by a first chain 238. In a version of the invention, the housing 208 is connected to the chandelier fixture 202 by a second chain 240. In some embodiments, the second chain 240 is partially or entirely enclosed in a sleeve 242. For clarity, the sleeve 242 is shown in the figures as being bunched up and partially enclosing the chain so that the chain is visible and can be labeled. The sleeve 242 preferably is constructed of fabric and entirely encloses the second chain 240. The sleeve 242 protects the electrical wiring that passes between the housing 208 and the chandelier fixture 202 and provides an attractive covering for the second chain 240.

In a version of the invention, the LED 206 is encapsulated in an artificial flame 246 formed from plastic. In some embodiments, the LED 206 is secured at the bottom of the artificial corolla 226.

The control circuit 210 is within the housing 208, and it is electronically connected to the LED 206. The control circuit 210 has electronic circuitry to cause the LED 206 to illuminate at a preselected time each day, remain illuminated for a predetermined interval, and then extinguish. The battery 212 is within the housing 208, and it is electrically connected to the LED 206 and the control circuit 210 to provide electrical power to the LED 206 and the control circuit 210. An example of one version of the control circuit 210 is shown in FIG. 25.

Figure 23:
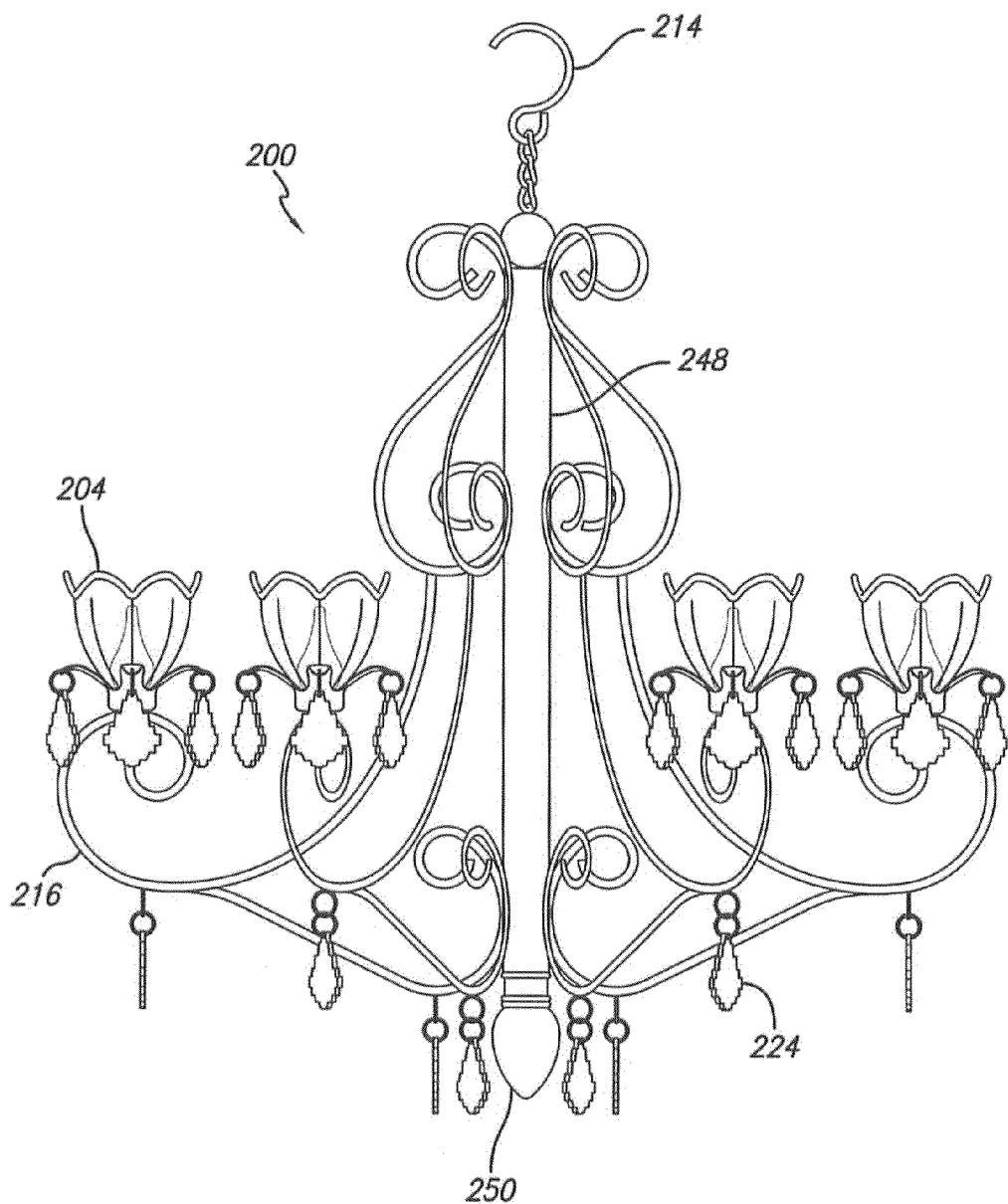
FIG. 23 is a front view of an alternative embodiment of a Battery Powered Decorative Light with Timer in the form of a chandelier.

In a version of the invention shown in FIG. 23, the decorative light 200 also includes a central post 248, preferably instead of the housing 208. In such embodiments, the control circuit 210 and the battery 212 may be housed within the central post 248. The battery 212 may be accessible through a threaded cap 250 at either end of the central post 248.

Figure 24:
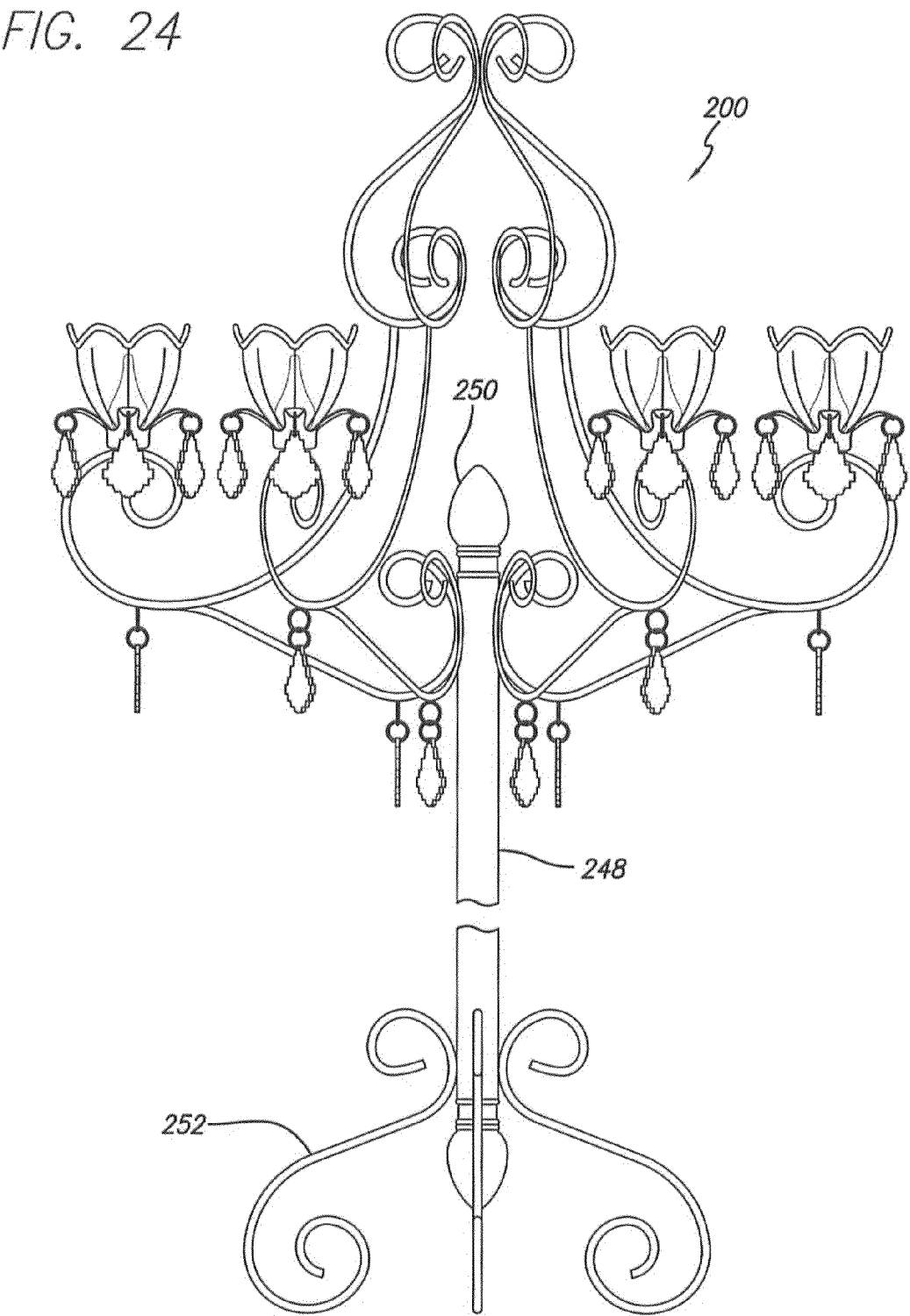
FIG. 24 is a front view of an embodiment of a Battery Powered Decorative Light with Timer in the form of a floor lamp. The support post of the floor lamp is shown discontinuous since it could be of any length.

The decorative light 200 of the type shown in FIG. 23 may also take the form of a floor lamp, such as is depicted in FIG. 24, by having an extended central post 248 and including support legs 252. In this way, the decorative light 200 may be supported on a floor, the ground, or another generally horizontal surface in the manner of a floor lamp. Again, in such embodiments the control circuit 210 and the battery 212 may be housed within the central post 248, and the battery 212 may be accessible through the threaded cap 250, which could be at either end of the central post 248. In FIG. 24, the central post 248 of the decorative light 200 is shown discontinuous since it could be of any length.

In an embodiment of the invention shown in FIGS. 13-22, the decorative light 300 includes a suspended sphere 302, a light-diffractive ornament 304, an array of light emitting diodes (LED) 306, a housing 308 separate from the sphere 302, a control circuit 310, and a battery 312.

The sphere 302 has a sphere diameter 314 and an interior 316 (shown in cross-section in FIG. 16), and the interior 316 is hollow. The sphere 302 has a plurality of metallic rings 318, and each ring 318 has a ring diameter 320. Preferably, the ring diameter 320 is ten to fifteen percent of the sphere diameter 314, and in an embodiment, the ring diameter 320 is 12 mm (about ½ inch) and the sphere diameter 314 is 100 mm (about 4 inches). Each ring 318 is preferably connected to at least three adjacent rings 318. The plurality of metallic rings 318 forms the shell 322 of the sphere 302, where the shell 322 of the sphere 302 also has interstices 324 between the rings 318.

The light-diffractive ornament 304 is centered within each of the plurality of metallic rings 318, and the ornament 304 has a front side 326 and a back side 328. In a version of the invention, the ornament 304 is an octagonal disk. Preferably, the ornament 304 has a span 330 sixty-five to eighty-five percent of the ring diameter 320 so as to substantially occupy the center of the ring 318. In an embodiment, the front side 326 (facing away from the interior 316 of the sphere 302) of the ornament 304 has a plurality of facets 332. In an embodiment, the back side 328 (facing toward the interior 316 of the sphere 302) of the ornament 304 has a plurality of facets 332. The facets 332 help to redirect light from the LED 306 as it passes through the ornament 304. In this way, the ornaments 304 provide an illusion that the LED 306 are moving as the decorative light 300 rotates or as an observer observes the decorative light 300 from different angles. It also provides an illusion that there are more LED 306 than are actually present.

The array of LED 306 is arranged in the interior 316 of the sphere 302. The control circuit 310 is within the housing 308, and it is electronically connected to the array of LED 306. The control circuit 310 has electronic circuitry to cause the array of LED 306 to illuminate at a preselected time each day, remain illuminated for a predetermined interval, and then extinguish. The battery 312 is within the housing 308, and it is electrically connected to the array of LED 306 and the control circuit 310 to provide electrical power to the array of LED 306 and the control circuit 310. An example of one version of the control circuit 310 is shown in FIG. 25.

In a version of the invention, the housing 308 is connected to the sphere 302 by a chain 334. In the figures, the chain 334 is shown discontinuous since it could be of any length. The decorative light 300 may also include a hook 336.

Figure 26:
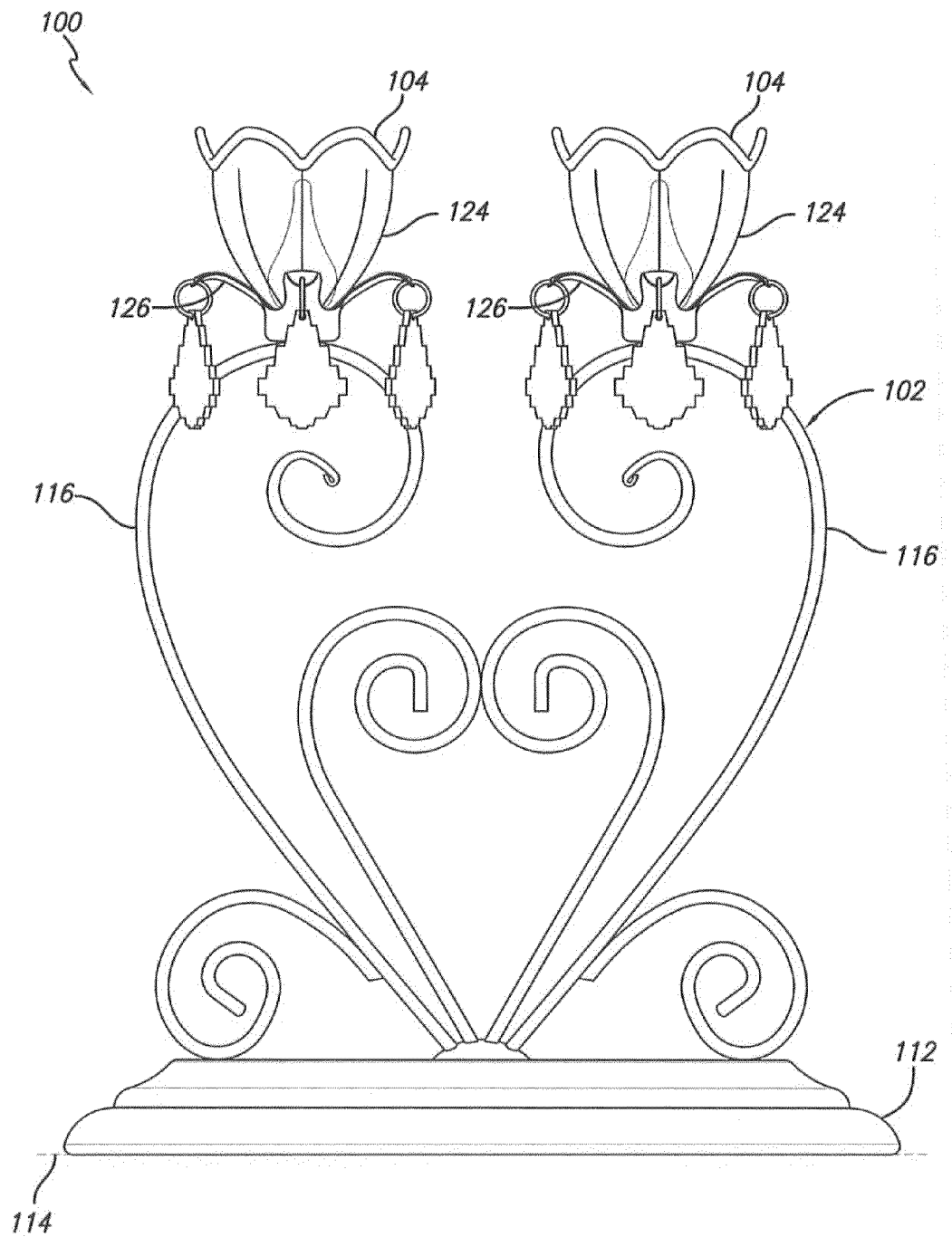
FIG. 26 is a front view of an embodiment of the Battery Powered Decorative Light with Timer that is a variation of the embodiment shown in FIG. 1.
Figure 27:
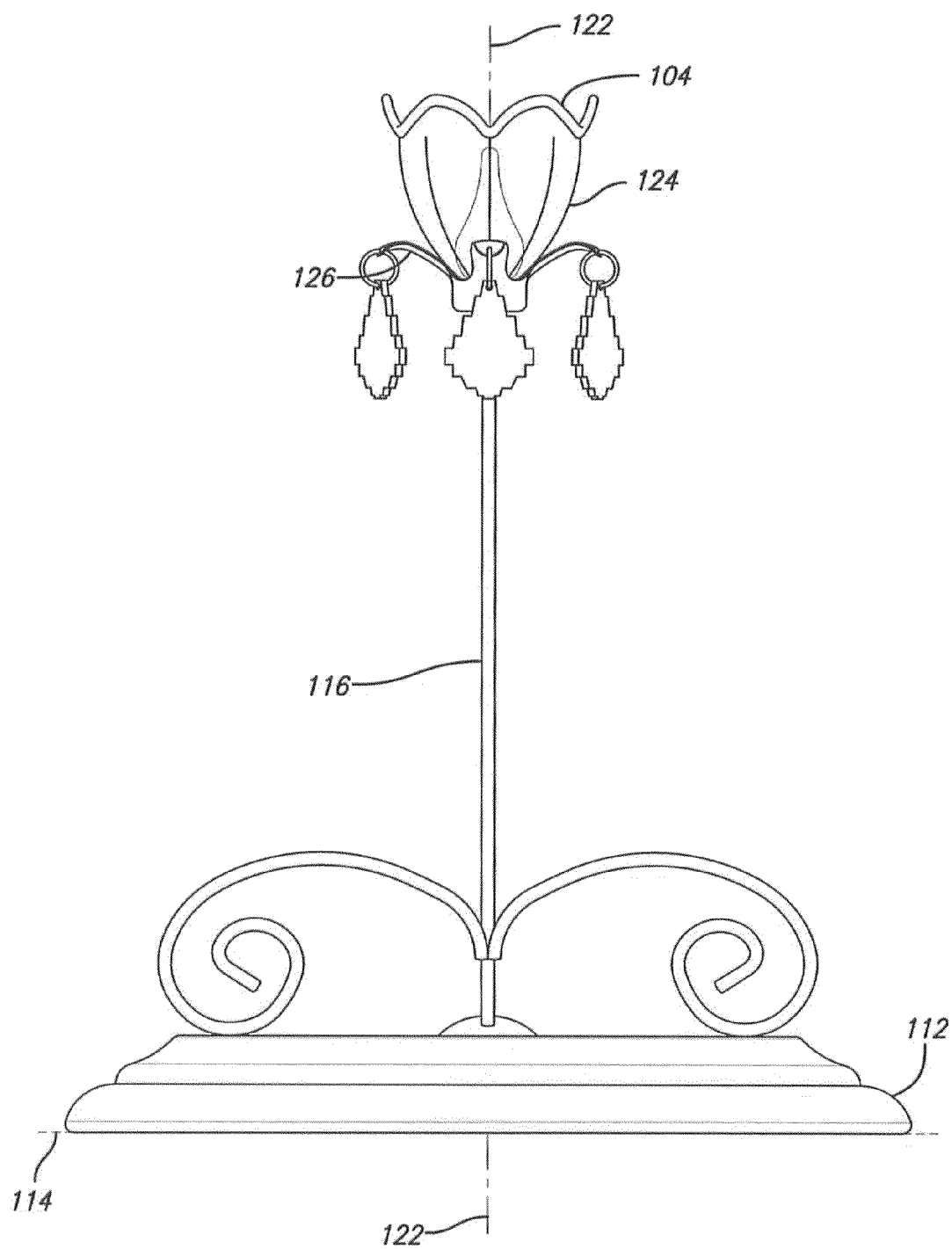
FIG. 27 is a right side view of the embodiment of the Battery Powered Decorative Light with Timer shown in FIG. 26.

The embodiment of the invention shown in FIGS. 26 and 27 is a variation of the embodiment shown in FIGS. 1-6. As such, those features not shown in FIGS. 26 and 27 can be analogized from those shown in FIGS. 1-6. Referring to FIGS. 26 and 27, the decorative light 100 includes a candelabrum fixture 102, a plurality of artificial flower blossoms 104 supported on the candelabrum fixture 102, a light emitting diode (LED) 106 in each of the artificial flower blossoms 104, a control circuit 108, and a battery 110.

The candelabrum fixture 102 rests on a base 112, which defines a horizontal plane 114 (shown from two different ends in FIGS. 26 and 27). The candelabrum fixture 102 has a plurality of arms 116 that extend from the base 112. The plurality of arms 116 defines a vertical plane 122 (shown from one end in FIG. 27), and the horizontal plane 114 of the base 112 is perpendicular to the vertical plane 122 of the arms 116. The base 112 supports the candelabrum fixture 102 and permits the candelabrum fixture 102 to be freestanding.

The plurality of artificial flower blossoms 104 is supported on the candelabrum fixture 102, preferably by being directly attached to the candelabrum fixture 102. Each artificial flower blossom 104 is centered about the vertical plane 122. Furthermore, each artificial flower blossom 104 has an artificial corolla 124 and an artificial calyx 126. Each artificial flower blossom 104 also forms a first cuplike cavity 128 having closed sides and an open top. The calyx 126 has a plurality of artificial sepals 130, where each sepal 130 has a fixed end 132 and a cantilevered end 134 opposite the fixed end 132. Preferably, the corolla 124 is made of see-through glass permitting the LED 106 to be visible through the corolla 124. Throughout this description, the term "glass" means, common glass as well as other substances, such as acrylic resins, that have the glass-like properties of being hard and transparent or translucent. Preferably, the calyx 126 is metallic to blend visually with the candelabrum fixture 102 and to provide structural integrity. In a version of the invention, the fixed end 132 of each sepal 130 is attached to a second cuplike cavity 136, which encases and supports the bottom 138 of the artificial corolla 124.

The control circuit 108 is housed within the base 112, and it is electronically connected to each LED 106. The control circuit 108 has electronic circuitry to cause each LED 106 to illuminate at a preselected time each day, remain illuminated for a predetermined interval, and then extinguish. An example of one version of the control circuit 108 is shown in FIG. 25.

The battery 110 is housed within the base 112, and it is electrically connected to each LED 106 and the control circuit 108 to provide electrical power to each LED 106 and the control circuit 108. In a version of the invention, the LED 106 is encapsulated in an artificial flame 142 formed from plastic. In some embodiments, the LED 106 is secured at the bottom 138 of the artificial corolla 124.

For each of the disclosed embodiments, in a version of the invention, the preselected time is not selected based on an ambient light level, and the predetermined interval is not determined based on the ambient light level. In another version of the invention, the control circuit 108, 210, 310 also has electronic circuitry to determine a measured light level. In such versions, the preselected time is selected based on the measured light level, and the predetermined interval is determined based on the measured light level.

In addition, for the disclosed embodiments shown in FIGS. 1-12, 23, 24, 26, and 27, in a version of the invention, the corolla (124, 226) is threaded into the calyx (126, 228) so that the corolla and the LED are replaceable. An example of this is shown in FIG. 26.

Consequently, each of the disclosed embodiments provides a battery powered decorative light with a timer. The decorative light is readily portable and can be easily relocated and installed in a number of locations by use of the hook.

While the present invention has been described with regards to particular embodiments, it is recognized that additional variations of the present invention may be devised without departing from the inventive concept.

INDUSTRIAL APPLICABILITY

This invention may be industrially applied to the development, manufacture, and use of decorative lighting.

What is claimed is:

1. An easily portable, decorative light comprising:
(a) a metallic candelabrum fixture resting on a rectangular base, the base defining a horizontal plane, the candelabrum fixture having a plurality of arms branching laterally from a central post, the plurality of arms defining a vertical plane running through the central post, each arm comprising an S-curve, the horizontal plane of the base being perpendicular to the vertical plane of the arms, the base supporting the candelabrum fixture and permitting the candelabrum fixture to be freestanding;
(b) a plurality of artificial flower blossoms supported on the candelabrum fixture, each artificial flower blossom being centered about the vertical plane, and each artificial flower blossom comprising an artificial corolla and an artificial calyx, the corolla being made of see-through glass and forming a first cuplike cavity having closed sides and an open top, the calyx being metallic and having a plurality of artificial sepals, each sepal having a fixed end and a cantilevered end opposite the fixed end, each fixed end being attached to a second cuplike cavity, the second cuplike cavity encasing a bottom of the artificial corolla, each sepal having a drop ornament dangling from the cantilevered end;
(c) a light emitting diode (LED) centered in each of the artificial flower blossoms, each LED being encapsulated in an artificial flame formed from plastic, each LED being secured at the bottom of the artificial corolla;
(d) a control circuit housed within the base and electronically connected to each LED, the control circuit having electronic circuitry to cause each LED to illuminate at a preselected time each day, remain illuminated for a predetermined interval, then extinguish, where the preselected time is not selected based on an ambient light level, and the predetermined interval is not determined based on the ambient light level; and
(e) a battery housed within the base and electrically connected to each LED and the control circuit to provide electrical power to each LED and the control circuit.

2. An easily portable, decorative light comprising:
(a) a candelabrum fixture resting on a base, the base defining a horizontal plane, the candelabrum fixture having a plurality of arms branching laterally from a central post, the plurality of arms defining a vertical plane running through the central post, the horizontal plane of the base being perpendicular to the vertical plane of the arms, the base supporting the candelabrum fixture and permitting the candelabrum fixture to be freestanding;
(b) a plurality of artificial flower blossoms supported on the candelabrum fixture, each artificial flower blossom being centered about the vertical plane, and each artificial flower blossom comprising an artificial corolla and an artificial calyx, and forming a first cuplike cavity having closed sides and an open top, the calyx having a plurality of artificial sepals, each sepal having a fixed end and a cantilevered end opposite the fixed end;
(c) a light emitting diode (LED) in each of the artificial flower blossoms;
(d) a control circuit housed within the base and electronically connected to each LED, the control circuit having electronic circuitry to cause each LED to illuminate at a preselected time each day, remain illuminated for a predetermined interval, then extinguish; and
(e) a battery housed within the base and electrically connected to each LED and the control circuit to provide electrical power to each LED and the control circuit.

3. The decorative light of claim 2, the base being rectangular and each arm comprising an S-curve.

4. The decorative light of claim 2, the corolla being made of see-through glass.

5. The decorative light of claim 2, the calyx being metallic.

6. The decorative light of claim 2, the fixed end of each sepal being attached to a second cuplike cavity, the second cuplike cavity encasing a bottom of the artificial corolla.

7. The decorative light of claim 2, each sepal having a drop ornament dangling from the cantilevered end.

8. The decorative light of claim 2, each LED being encapsulated in an artificial flame formed from plastic.

9. The decorative light of claim 2, each LED being secured at the bottom of the artificial corolla.

10. The decorative light of claim 2, where the preselected time is not selected based on an ambient light level, and the predetermined interval is not determined based on the ambient light level.

11. The decorative light of claim 2, the control circuit further having electronic circuitry to determine a measured light level, the preselected time being selected based on the measured light level, and the predetermined interval being determined based on the measured light level.

12. An easily portable, decorative light comprising:
  (a) a metallic chandelier fixture suspended from a hook, the chandelier fixture having a plurality of arms branching radially and symmetrically from a vertical axis, each arm comprising a curvilinear tube, each arm having a dangling drop ornament, each arm defining a radial plane, the hook supporting the chandelier fixture and being located on the vertical axis;
  (b) an artificial flower blossom supported on each arm, the artificial flower blossom being centered about the radial plane of the arm, and the artificial flower blossom comprising an artificial corolla and an artificial calyx, the corolla being made of see-through glass and forming a first cuplike cavity having closed sides and an open top, the calyx being metallic and having a plurality of artificial sepals, each sepal having a fixed end and a cantilevered end opposite the fixed end, each fixed end being attached to a second cuplike cavity, the second cuplike cavity encasing a bottom of the artificial corolla, each sepal having a drop ornament dangling from the cantilevered end;
  (c) a light emitting diode (LED) centered in the artificial flower blossom, the LED being encapsulated in an artificial flame formed from plastic, the LED being secured at the bottom of the artificial corolla;
  (d) a housing located between, and being separate from, the hook and the chandelier fixture, the housing comprising a semi-hemispherical, decorative collar, the housing being connected to the hook by a first chain, the housing being connected to the chandelier fixture by a second chain, the second chain being enclosed in a fabric sleeve;
  (e) a control circuit within the housing and electronically connected to the LED, the control circuit having electronic circuitry to cause the LED to illuminate at a preselected time each day, remain illuminated for a predetermined interval, then extinguish, where the preselected time is not selected based on an ambient light level, and the predetermined interval is not determined based on the ambient light level; and
  (f) a battery within the housing and electrically connected to the LED and the control circuit to provide electrical power to the LED and the control circuit.

13. An easily portable, decorative light comprising:
  (a) a chandelier fixture suspended from a hook, the chandelier fixture having a plurality of arms branching radially from a vertical axis, each arm defining a radial plane, the hook supporting the chandelier fixture and being located on the vertical axis;
  (b) an artificial flower blossom supported on each arm, and the artificial flower blossom comprising an artificial corolla and an artificial calyx, the corolla forming a first cuplike cavity having closed sides and an open top, the calyx having a plurality of artificial sepals, each sepal having a fixed end and a cantilevered end opposite the fixed end;
  (c) a light emitting diode (LED) in the artificial flower blossom;
  (d) a housing located between the hook and the chandelier fixture, the housing comprising a decorative collar;
  (e) a control circuit within the housing and electronically connected to the LED, the control circuit having electronic circuitry to cause the LED to illuminate at a preselected time each day, remain illuminated for a predetermined interval, then extinguish; and
  (f) a battery within the housing and electrically connected to the LED and the control circuit to provide electrical power to the LED and the control circuit.

14. The decorative light of claim 13, the plurality of arms branching symmetrically from a vertical axis.

15. The decorative light of claim 13, each arm comprising a curvilinear tube.

16. The decorative light of claim 13, each arm having a dangling drop ornament.

17. The decorative light of claim 13, the artificial flower blossom being centered about the radial plane for the arm.

18. The decorative light of claim 13, the corolla being made of see-through glass.

19. The decorative light of claim 13, the calyx being metallic.

20. The decorative light of claim 13, the fixed end of each sepal being attached to a second cuplike cavity, the second cuplike cavity encasing a bottom of the artificial corolla.

21. The decorative light of claim 13, each sepal having a drop ornament dangling from the cantilevered end.

22. The decorative light of claim 13, the LED being encapsulated in an artificial flame formed from plastic.

23. The decorative light of claim 13, the LED being secured at the bottom of the artificial corolla.

24. The decorative light of claim 13, the housing being separate from the hook and the chandelier fixture.

25. The decorative light of claim 13, the housing being connected to the hook by a first chain.

26. The decorative light of claim 13, the housing being connected to the chandelier fixture by a second chain.

27. The decorative light of claim 26, the second chain being enclosed in a fabric sleeve.

28. The decorative light of claim 13, where the preselected time is not selected based on an ambient light level, and the predetermined interval is not determined based on the ambient light level.

29. The decorative light of claim 13, the control circuit further having electronic circuitry to determine a measured light level, the preselected time being selected based on the measured light level, and the predetermined interval being determined based on the measured light level.

30. An easily portable, decorative light comprising:
  (a) a sphere suspended from a hook, the sphere having a sphere diameter and an interior, the interior being hollow, the sphere having a plurality of metallic rings, each ring having a ring diameter, the ring diameter being ten to fifteen percent of the sphere diameter, each ring being connected to at least three adjacent rings, the plurality of metallic rings forming a shell of the sphere, the shell of the sphere further having interstices between the rings;
  (b) an ornament centered within each of the plurality of metallic rings, the ornament being a light-diffractive, octagonal disk, the ornament having a span sixty-five to eighty-five percent of the ring diameter, the ornament having a front side and a back side, the front side having a plurality of facets, the back side also having a plurality of facets;

(c) an array of light emitting diodes (LED), the array of LED arranged in the interior of the sphere;

(d) a housing located between, and being separate from, the hook and the sphere, the housing comprising a cylindrical tube, the housing being connected to the hook by a first chain, the housing being connected to the sphere by second chain;

(e) a control circuit within the housing and electronically connected to the array of LED, the control circuit having electronic circuitry to cause the array of LED to illuminate at a preselected time each day, remain illuminated for a predetermined interval, then extinguish, where the preselected time is not selected based on an ambient light level, and the predetermined interval is not determined based on the ambient light level; and (f) a battery within the housing and electrically connected to the array of LED and the control circuit to provide electrical power to the array of LED and the control circuit.

31. An easily portable, decorative light comprising:

(a) a suspended sphere, the sphere having a sphere diameter and an interior, the interior being hollow, the sphere having a plurality of metallic rings, each ring having a ring diameter, each ring being connected to at least three adjacent rings, the plurality of metallic rings forming a shell of the sphere, the shell of the sphere further having interstices between the rings;

(b) a light-diffractive ornament centered within each of the plurality of metallic rings, the ornament having a front side and a back side;

(c) an array of light emitting diodes (LED), the array of LED arranged in the interior of the sphere;

(d) a housing separate from the sphere;

(e) a control circuit within the housing and electronically connected to the array of LED, the control circuit having electronic circuitry to cause the array of LED to illuminate at a preselected time each day, remain illuminated for a predetermined interval, then extinguish; and (f) a battery within the housing and electrically connected to the array of LED and the control circuit to provide electrical power to the array of LED and the control circuit.

32. The decorative light of claim 31, the ring diameter being ten to fifteen percent of the sphere diameter.

33. The decorative light of claim 31, the ornament being an octagonal disk.

34. The decorative light of claim 31, the ornament having a span sixty-five to eighty-five percent of the ring diameter.

35. The decorative light of claim 31, the front side of the ornament having a plurality of facets.

36. The decorative light of claim 31, the back side of the ornament having a plurality of facets.

37. The decorative light of claim 31, the housing comprising a cylindrical tube.

38. The decorative light of claim 31, the housing being connected to the sphere by a chain.

39. The decorative light of claim 31, where the preselected time is not selected based on an ambient light level, and the predetermined interval is not determined based on the ambient light level.

40. The decorative light of claim 31, the control circuit further having electronic circuitry to determine a measured light level, the preselected time being selected based on the measured light level, and the predetermined interval being determined based on the measured light level.

41. An easily portable, decorative light comprising:

(a) a chandelier fixture, the chandelier fixture having a plurality of arms branching radially from a central post defining a vertical axis, each arm defining a radial plane;

(b) an artificial flower blossom supported on each arm, and the artificial flower blossom comprising an artificial corolla and an artificial calyx, the corolla forming a first cuplike cavity having closed sides and an open top, the calyx having a plurality of artificial sepals, each sepal having a fixed end and a cantilevered end opposite the fixed end;

(c) a light emitting diode (LED) in the artificial flower blossom;

(d) a control circuit within the central post and electronically connected to the LED, the control circuit having electronic circuitry to cause the LED to illuminate at a preselected time each day, remain illuminated for a predetermined interval, then extinguish; and (e) a battery within the central post and electrically connected to the LED and the control circuit to provide electrical power to the LED and the control circuit.

42. The decorative light of claim 41, the central post further comprising a threaded cap at an end of the central post, the threaded cap permitting the battery to be inserted into and removed from the central post.

43. The decorative light of claim 41, the chandelier fixture being suspended from a hook, the hook supporting the chandelier fixture and being located on the vertical axis.

44. The decorative light of claim 41, the central post being an elongated central post and further comprising support legs, the central post and the support legs supporting the chandelier fixture.

45. An easily portable, decorative light comprising:

(a) a candelabrum fixture resting on a base, the base defining a horizontal plane, the candelabrum fixture having a plurality of arms extending from the base, the plurality of arms defining a vertical plane, the horizontal plane of the base being perpendicular to the vertical plane of the arms, the base supporting the candelabrum fixture and permitting the candelabrum fixture to be freestanding;

(b) a plurality of artificial flower blossoms supported on the candelabrum fixture, each artificial flower blossom being centered about the vertical plane, and each artificial flower blossom comprising an artificial corolla and an artificial calyx, and forming a first cuplike cavity having closed sides and an open top, the calyx having a plurality of artificial sepals, each sepal having a fixed end and a cantilevered end opposite the fixed end;

(c) a light emitting diode (LED) in each of the artificial flower blossoms;

(d) a control circuit housed within the base and electronically connected to each LED, the control circuit having electronic circuitry to cause each LED to illuminate at a preselected time each day, remain illuminated for a predetermined interval, then extinguish; and (e) a battery housed within the base and electrically connected to each LED and the control circuit to provide electrical power to each LED and the control circuit.

46. The decorative light of claim 45, the corolla being made of see-through glass and the calyx being metallic, the corolla being threaded into the calyx.

47. The decorative light of claim 45, the fixed end of each sepal being attached to a second cuplike cavity, the second cuplike cavity encasing a bottom of the artificial corolla.

48. The decorative light of claim 45, each LED being encapsulated in an artificial flame formed from plastic.

49. The decorative light of claim 45, where the preselected time is not selected based on an ambient light level, and the predetermined interval is not determined based on the ambient light level.

50. The decorative light of claim 45, the control circuit further having electronic circuitry to determine a measured light level, the preselected time being selected based on the measured light level, and the predetermined interval being determined based on the measured light level.

* * * * *